(12) United States Patent
Schexnaider

(10) Patent No.: US 8,801,837 B2
(45) Date of Patent: Aug. 12, 2014

(54) DE-AERATOR DAMPENER SEPARATOR AND RELATED METHODS

(75) Inventor: Neil Schexnaider, Broussard, LA (US)

(73) Assignee: Halliburton Energy Services, Inc., Houston, TX (US)

( * ) Notice: Subject to any disclaimer, the term of this patent is extended or adjusted under 35 U.S.C. 154(b) by 209 days.

(21) Appl. No.: 13/386,351

(22) PCT Filed: Jul. 30, 2009

(86) PCT No.: PCT/US2009/004388
§ 371 (c)(1),
(2), (4) Date: Apr. 9, 2012

(87) PCT Pub. No.: WO2011/014141
PCT Pub. Date: Feb. 3, 2011

(65) Prior Publication Data
US 2012/0186450 A1 Jul. 26, 2012

(51) Int. Cl.
*B01D 19/00* (2006.01)
(52) U.S. Cl.
USPC ............... 95/261; 95/242; 96/212; 96/220; 96/176
(58) Field of Classification Search
USPC ............ 95/261, 242; 96/209, 212, 210, 211, 96/220, 176
See application file for complete search history.

(56) References Cited

U.S. PATENT DOCUMENTS

| 4,093,428 | A | * | 6/1978 | Swogger | 95/261 |
| 6,811,690 | B2 | | 11/2004 | Arnaud | |
| 7,172,647 | B2 | * | 2/2007 | Grasso | 95/261 |
| 2006/0047161 | A1 | | 3/2006 | Wonders et al. | |

FOREIGN PATENT DOCUMENTS

WO WO-2011014141 A1 2/2011

OTHER PUBLICATIONS

International Application Serial No. PCT/US2009/004388, International Preliminary Report on Patentability mailed Oct. 11, 2011, 6 pgs.
International Application Serial No. PCT/US2009/004388, Search Report mailed Sep. 21, 2009.
International Application Serial No. PCT/US2009/004833, Written Opinion mailed Sep. 21, 2009.

* cited by examiner

*Primary Examiner* — Duane Smith
*Assistant Examiner* — Douglas Theisen
(74) *Attorney, Agent, or Firm* — Schwegman, Lundberg & Woessner, P.A.; Alan Bryson

(57) ABSTRACT

A de-aerator dampener separator includes a separator with a vortex chamber having at least one vortex chamber entry port. The de-aerator dampener separator further includes a column assembly with a column entry port in fluid communication with the vortex chamber exit port. The de-aerator dampener separator further includes a baffle within the column assembly.

20 Claims, 6 Drawing Sheets

US 8,801,837 B2

DE-AERATOR DAMPENER SEPARATOR AND RELATED METHODS

RELATED APPLICATIONS

This application is a U.S. National Stage Filing under 35 U.S.C. 371 from International Application No. PCT/US2009/004388, filed on Jul. 30, 2009, and published as WO 2011/014141 A1 on Feb. 3, 2011; which application and publication are incorporated herein by reference in their entirety.

TECHNICAL FIELD

The application relates generally to a de-aerator dampener separator.

BACKGROUND

Drilling fluid contains solids, and gas bubbles. In an active well, the drilling fluid is monitored with sensors, and drilling parameters are determined. The level of hydrocarbons in the drilling fluid is also measured and evaluated. However, the solids and gas bubbles of the drilling fluid can affect the measurements and/or further processing or use of the drilling fluid.

BRIEF DESCRIPTION OF THE DRAWINGS

The embodiments are provided by way of example and not limitation in the figures of the accompanying drawings, in which like references indicate similar elements and in which.

DETAILED DESCRIPTION

Methods, apparatus and systems for using a de-aerator separator dampener are described. In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
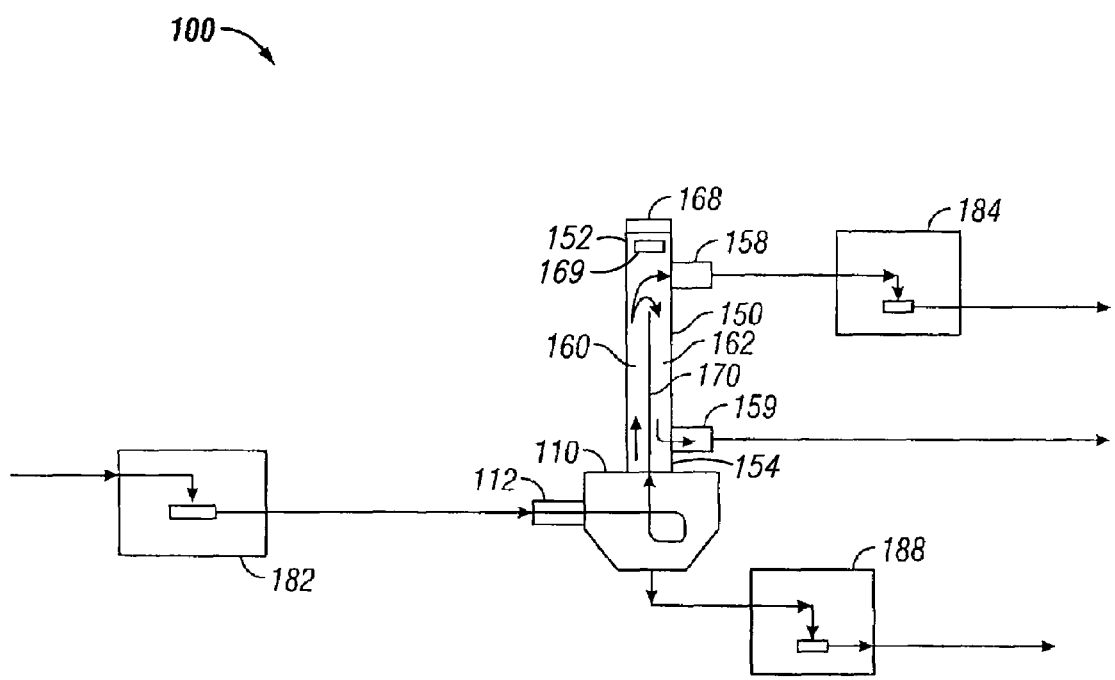
FIG. 1 illustrates a block view of a de-aerator separator dampener, according to example embodiments.
Figure 2:
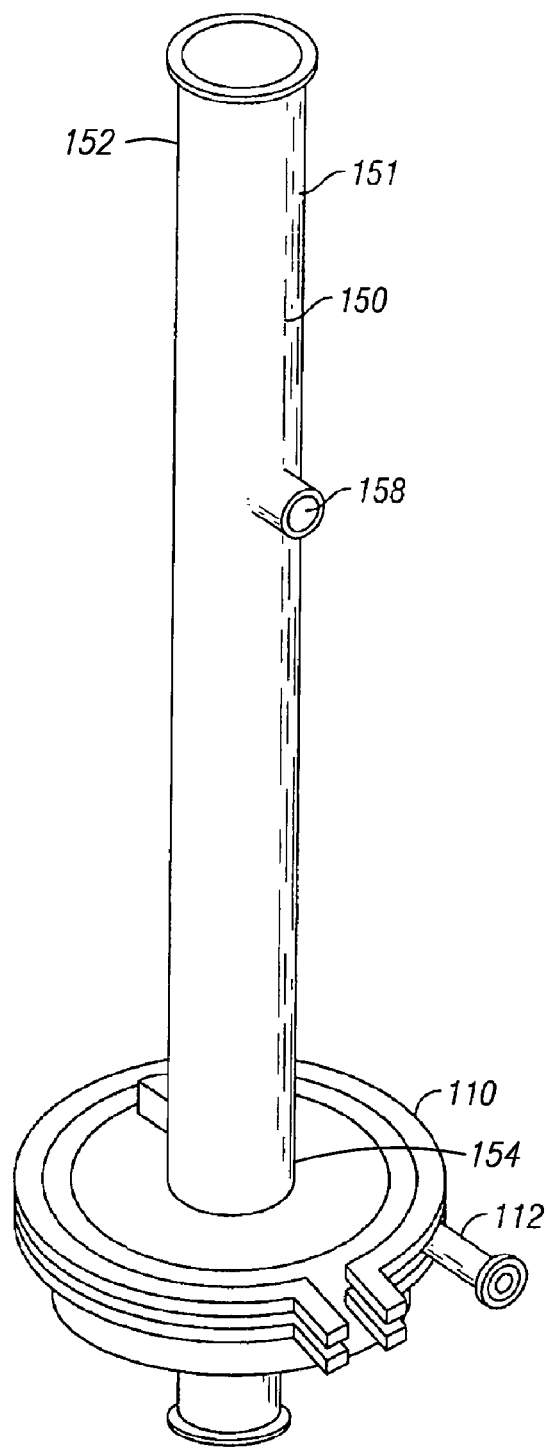
FIG. 2 illustrates a perspective view of a de-aerator separator dampener, according to example embodiments.
Figure 3:
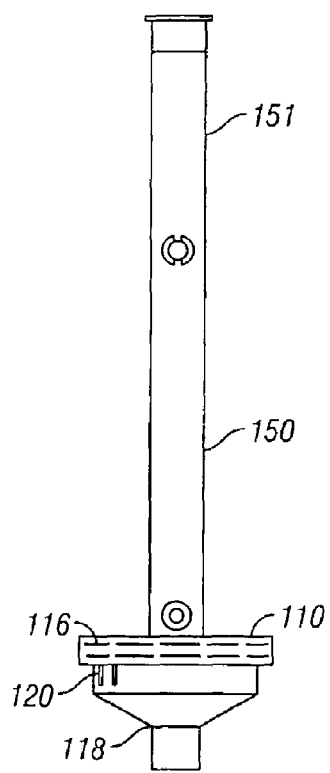
FIG. 3 illustrates a side view of a de-aerator separator dampener, according to example embodiments.
Figure 4:
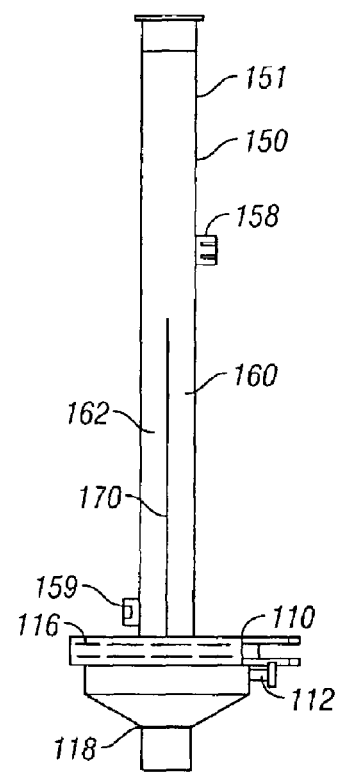
FIG. 4 illustrates a side view of a de-aerator separator dampener, according to example embodiments.
Figure 5A:
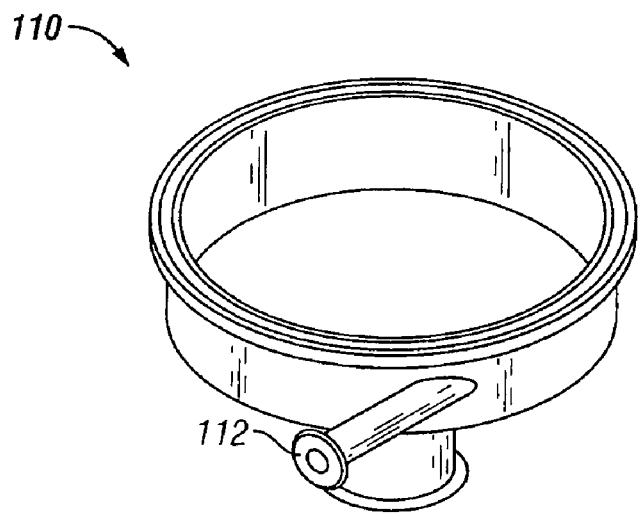
FIG. 5A illustrates a perspective view of a vortex chamber, according to example embodiments.
Figure 5B:
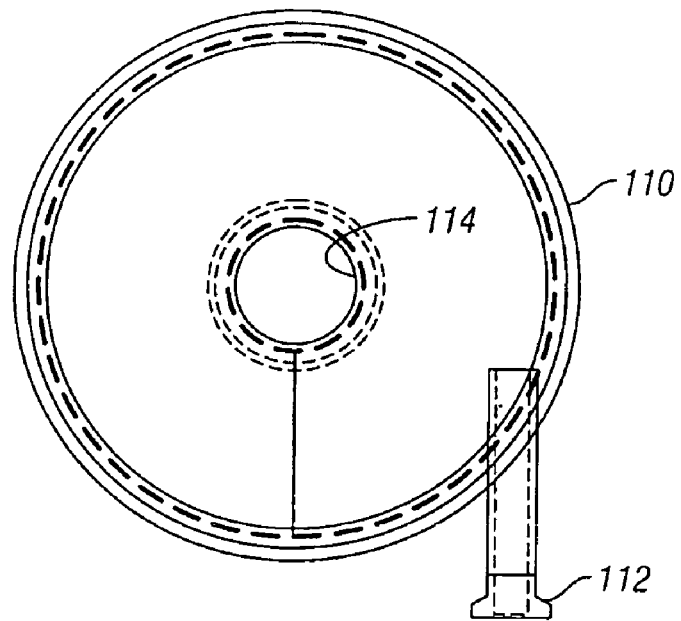
FIG. 5B illustrates a top view of a vortex chamber, according to example embodiments.
Figure 5C:
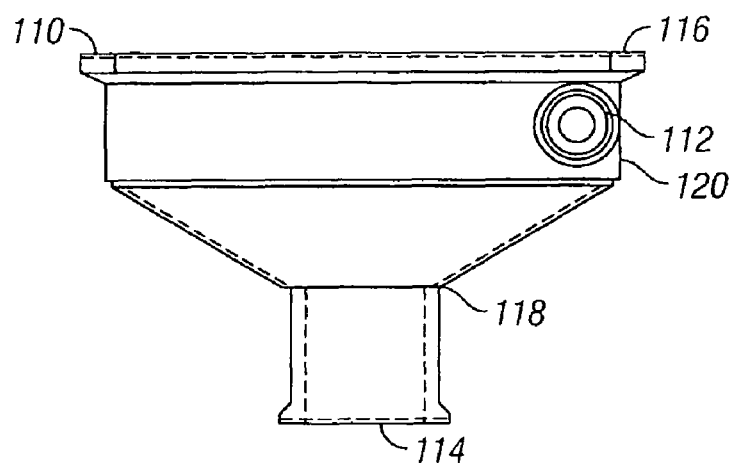
FIG. 5C illustrates a side view of a vortex chamber, according to example embodiments.

FIGS. 1-2 illustrate an example of an apparatus such as a de-aerator separator dampener 100. The de-aerator separator dampener 100 is an apparatus in which drilling fluid from an active well can be processed in order to remove entrained air or bas bubbles, dampen fluid pulsations, and separate suspended solids, such as fine solids. The de-aerator separator dampener 100 includes a separator, such as a vortex chamber 110, and column assembly 150, a baffle 170 within the column assembly 150, and one or more pumps 182, 184, and 188. In an option, the de-aerator separator dampener 100 is constructed of stainless steel, for instance, for corrosion resistance, and is sealed with sanitary clamps and o-rings.

The vortex chamber 110, as shown in more detail in FIGS. 3, 4, 5A, 5B, and 5C, has at least one vortex chamber entry port 112 and at least one vortex chamber exit port 114. The vortex chamber 110 is defined in part by a vortex top portion 116 and a vortex bottom portion 118 and a vortex upper side portion 120 therebetween. The vortex chamber 110 in an option has a frustoconical shape, allowing for incoming fluid to form a vortex within the vortex chamber 110. In an option, the at least one vortex chamber entry port 112 is on the vortex upper side portion 120. The vortex chamber entry port 112 is situated so that the entering drilling fluid is forced to create a vortex, where the outer diameter is near the entry port 112 and the center of the vortex is situated near the portion leading to the column assembly 150. The vortex chamber 110 further includes a vortex chamber exit port 114 located at a vortex bottom portion 118. A solids pump 188 (FIG. 1) is further coupled with the vortex chamber exit port 114 and allows for solids to be pumped away from the vortex chamber 110 to waste.

In an option, drilling fluid is delivered from the well to the vortex chamber entry port 112 to the vortex chamber 110 via a delivery pump 182, which includes delivery conduit coupled with the delivery pump 182 and the at least one vortex chamber entry port 112.

The de-aerator separator dampener 100 further includes at least one column assembly 150, such as a vertical column, which is coupled with the vortex chamber 110. The column assembly 150 allows for air or gas bubbles to be shed from the fluid with its exit port, while having a sealed top portion which allows for, among other things, dampening of the pulsations. The column assembly 150 includes a column 151 that extends from a top portion 152 to a bottom portion 154, and the at least one column has a column entry port 156 proximate to the bottom portion 154. The column entry port 156 is in fluid communication with the at least one vortex chamber 110.

The column assembly 150 further includes a first column exit port 158 that is in fluid communication with a de-aerator pump 184 (FIG. 1), where a conduit is disposed between the column exit port 158 and the de-aerator pump 184 (FIG. 1). The de-aerator pump 184 delivers the pumped gases to waste. The column assembly 150 further includes a second column exit port 159, allowing for the processed drilling fluid to travel through for further processing. The first column exit port 158 is disposed near the top portion 152 of the at least one column assembly 150, and the second column exit port 159 is disposed near the bottom portion 154 of the at least one column assembly 150. In a further option, the column assembly 150 is sealed at a top portion of the column, for instance, and includes a dampening trapping cap 168 at the top portion of the column assembly 150. In yet another option, a top vent 169 is disposed near the top portion of the column assembly 150.

Figure 6A:
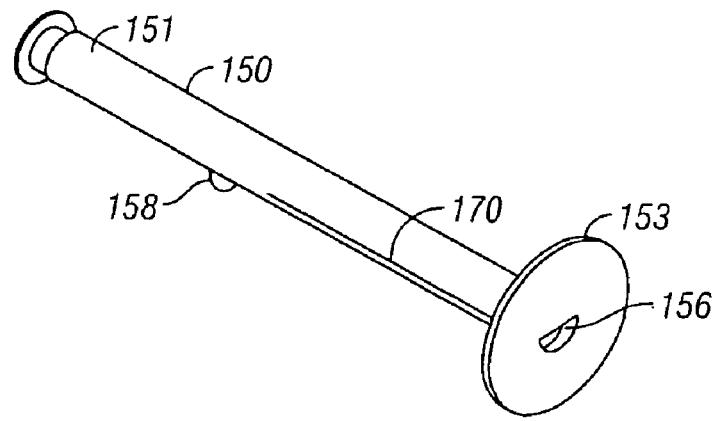
FIG. 6A illustrates a perspective view of a column assembly, according to example embodiments.
Figure 6B:
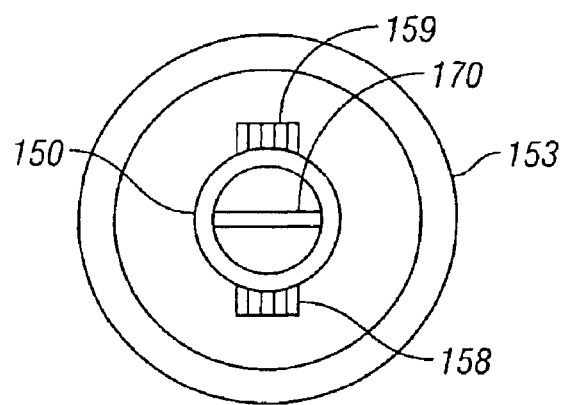
FIG. 6B illustrates a side view of a column assembly, according to example embodiments.
Figure 6C:
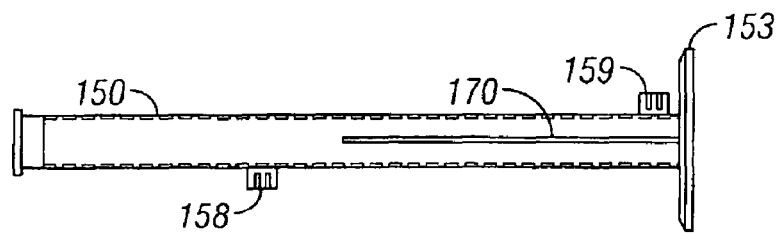
FIG. 6C illustrates a top view of a column assembly, according to example embodiments.

Disposed within the column assembly 150 is a baffle 170. The baffle 170 extends between two internal sides within the column assembly 150, as shown in FIG. 6, and defines a first portion 160 of the column assembly 150 and a second portion 162 of the column assembly 150. The baffle 170, in an option, extends to a top portion which is between the first and second exit ports 158, 159. In an option, the baffle 170 is a flat plate and the first portion 160 has a D-shaped cross-section and the second portion 162 has a D-shaped cross-section. In a further option, the first portion 160 is in fluid communication with the vortex chamber 110.

The column assembly 150 further includes a base 153. The base 153 is coupled with the column 151, and includes the entry port 156 therein. The base 153 is coupled with the vortex chamber 110, and provides the entry 156 to be in fluid communication with the vortex chamber 110. In an option, a cross-sectional area of the vortex chamber entry port 112 is smaller than a cross sectional area of the column entry port 156.

During use of the de-aerator separator dampener 100, the delivery pump delivers drilling fluid through a conduit to a vortex entry port of the vortex chamber 110. The fluid is forced to create a vortex, where the fluid enters the outer diameter of the vortex at a higher velocity than it exits the vortex chamber. As the fluid moves through the vortex from the outer diameter towards the inner diameter, the velocity of the fluid decreases. The decrease in the velocity causes the solids suspended in the drilling fluid to fall out of the fluid and settle in the cone shaped bottom portion of the vortex chamber. The collected solids are pumped out of the de-aerator separator dampener 100 via the vortex exit port and the solids pump connected therewith. In an option, the solids are pumped out of the de-aerator separator dampener 100 at a continuous rate, which assists in assuring the vortex is uninterrupted.

In a further option, a method includes pumping drilling fluid into at least one vortex chamber entry port of an apparatus, the apparatus including a separator including the vortex chamber having at least one vortex chamber entry port, at least one vortex chamber exit port, the vortex chamber defined in part by a vortex top portion and a vortex bottom portion and a vortex upper side portion therebetween, at least one column assembly having a column extending from a sealed top portion to a bottom portion, the at least one column assembly having a column entry port proximate to the bottom portion of the column, the column entry port in fluid communication with the at least one vortex chamber, the at least one column further including a first column exit port and a second column exit port, a baffle within the column, the baffle defining a first portion of the column and a second portion of the column, the first portion in fluid communication with the column entry port. The method further includes flowing fluid out of the vortex chamber and into the first portion of the column, and flowing fluid over a top of the baffle into the second portion of the column. In a further option, the method includes trapping air and gasses at the top portion of the column, pumping air and gasses from the first column exit port, and flowing processed drilling fluid through the second column exit port.

Further options for the method are as follows. In an option, the method further includes dampening pulsations of the pump with trapped air and/or trapped gasses, for instance with a dampening trapping cap. In a further option, during operation, solids fall out of the fluid while in the vortex chamber, and the method further includes collecting the solids in the bottom portion of the vortex chamber, such as, but not limited to, a cone-shaped bottom portion of the vortex chamber. In yet another option, the method further includes removing air and/or gas bubbles from the apparatus through a top vent, where removing the air and/or gas bubbles includes removing the air and/or gas bubbles from the apparatus at a continuous rate. Still further, pumping includes pumping drilling fluid from a well to the vortex chamber with a delivery pump, and further pumping solids from the vortex chamber with a solids pump, and pumping gases from the column with a de-aerator pump.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments may be practiced without such specific details. In other instances, control structures, gate level circuits and full software instruction sequences have not been shown in detail in order not to obscure the embodiments. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In view of the wide variety of permutations to the embodiments described herein, this detailed description is intended to be illustrative only, and should not be taken as limiting the scope of the invention. What is claimed as the invention, therefore, is all such modifications as may come within the scope of the following claims and equivalents thereto. Therefore, the specification and drawings are to be regarded in an illustrative rather than a restrictive sense.

What is claimed is:

1. An apparatus comprising:
  a separator including a vortex chamber having at least one vortex chamber entry port, at least one vortex chamber exit port, the vortex chamber defined in part by a vortex top portion and a vortex bottom portion and a vortex upper side portion there between;
  at least one column assembly including a column extending from a sealed top portion to a bottom portion, the at least one column assembly having a column entry port proximate to the bottom portion, the column entry port in fluid communication with the vortex chamber, the at least one column assembly further including a first column exit port and a second column exit port; and
  a baffle within the column assembly, the baffle defining a first portion of the column assembly and a second portion of the column assembly, the first portion in fluid communication with the column entry port.

2. The apparatus as recited in claim 1, wherein the vortex bottom portion has a frustoconical shape.

3. The apparatus as recited in claim 1, wherein the at least one vortex chamber entry port is disposed near the vortex upper side portion.

4. The apparatus as recited in claim 1, wherein the first column exit port is disposed near the top portion of the at least one column assembly, and the second column exit port is disposed near the bottom portion of the at least one column assembly.

5. The apparatus as recited in claim 1, wherein a cross-sectional area of the vortex chamber entry port is smaller than a cross sectional area of the column entry port.

6. The apparatus as recited in claim 1, where the column entry port has a D-shaped cross-section.

7. The apparatus as recited in claim 1, further comprising a dampening trapping cap at the top portion of the column assembly.

8. The apparatus as recited in claim 1, further comprising a top vent at the top portion of the column assembly.

9. A system comprising:
an apparatus including a separator including a vortex chamber having at least one vortex chamber entry port, at least one vortex chamber exit port, the vortex chamber defined in part by a vortex top portion and a vortex bottom portion and a vortex upper side portion therebetween, at least one column assembly extending from a sealed top portion to a bottom portion, the at least one column assembly having a column entry port proximate to the bottom portion, the column entry port in fluid communication with the vortex chamber, the at least one column assembly further including a first column exit port and a second column exit port, a baffle within the column assembly, the baffle defining a first portion of the column assembly and a second portion of the column assembly, the first portion in fluid communication with the column entry port; and
at least one pump including a delivery pump, a solids pump, and a de-aerator pump, the delivery pump coupled with the vortex chamber entry port, the solids pump coupled with the vortex chamber exit port, and the de-aerator pump coupled with the first column exit port.

10. The system as recited in claim 9, wherein the de-aerator pump is arranged with the first column exit port to pump gases to waste.

11. The system as recited in claim 9, wherein the solids pump is arranged with the vortex chamber exit port to pump solids to waste.

12. The system as recited in claim 9, wherein a cross-sectional area of the vortex chamber entry port is smaller than a cross sectional area of the column entry port.

13. The system as recited in claim 9, further comprising a dampening trapping cap at the top portion of the column assembly.

14. A method comprising:
pumping drilling fluid into at least one vortex chamber entry port of an apparatus, the apparatus including a separator including a vortex chamber having the at least one vortex chamber entry port, at least one vortex chamber exit port, the vortex chamber defined in part by a vortex top portion and a vortex bottom portion and a vortex upper side portion therebetween, at least one column assembly extending from a sealed top portion to a bottom portion, the at least one column assembly having a column entry port proximate to the bottom portion, the column entry port in fluid communication with the vortex chamber, the at least one column assembly further including a first column exit port and a second column exit port, a baffle within the column assembly, the baffle defining a first portion of the column assembly and a second portion of the column assembly, the first portion in fluid communication with the column entry port;
flowing fluid out of the vortex chamber and into the first portion of the column assembly;
flowing fluid over a top of the baffle into the second portion of the column assembly;
trapping air and gasses at the top portion of the column assembly;
pumping air and gasses from the first column exit port; and
flowing processed drilling fluid through the second column exit port.

15. The method as recited in claim 14, further comprising dampening pulsations of the pump with trapped air, trapped gasses, or trapped air and trapped gases.

16. The method as recited in claim 14, wherein solids fall out of the fluid, and further comprising collecting the solids in the bottom portion of the vortex chamber.

17. The method as recited in claim 16, wherein collecting the solids includes collecting the solids in a cone shaped bottom portion.

18. The method as recited in claim 14, further comprising removing air, gas bubbles, or air and gas bubbles from the apparatus through a top vent.

19. The method as recited in claim 18, wherein removing the air, gas bubbles, or air and gas bubbles includes removing the air, gas bubbles, or air and gas bubbles from the apparatus at a continuous rate.

20. The method as recited in claim 14, wherein pumping includes pumping drilling fluid from a well to the vortex chamber with a delivery pump, and further pumping solids from the vortex chamber with a solids pump, and pumping gases from the column assembly with a de-aerator pump.

* * * * *